United States Patent
Hsieh et al.

(10) Patent No.: US 10,884,506 B2
(45) Date of Patent: Jan. 5, 2021

(54) GESTURE RECOGNITION METHOD AND GESTURE RECOGNITION DEVICE

(71) Applicant: Wistron Corporation, New Taipei (TW)

(72) Inventors: Chia-Ta Hsieh, New Taipei (TW); Ting-Feng Ju, New Taipei (TW)

(73) Assignee: Wistron Corporation, New Taipei (TW)

( * ) Notice: Subject to any disclaimer, the term of this patent is extended or adjusted under 35 U.S.C. 154(b) by 127 days.

(21) Appl. No.: 16/403,615

(22) Filed: May 6, 2019

(65) Prior Publication Data

US 2020/0285320 A1    Sep. 10, 2020

(30) Foreign Application Priority Data

Mar. 7, 2019   (TW) .............................. 108107629 A

(51) Int. Cl.
  *G06F 3/01*   (2006.01)
  *G06K 9/00*   (2006.01)
  *G06T 7/246*  (2017.01)

(52) U.S. Cl.
  CPC ......... *G06F 3/017* (2013.01); *G06K 9/00355* (2013.01); *G06T 7/246* (2017.01); *G06T 2207/30196* (2013.01)

(58) Field of Classification Search
  CPC ..... G06F 3/017; G06F 3/011; G06K 9/00355; G06T 7/246; G06T 2207/30196
  See application file for complete search history.

(56) References Cited

U.S. PATENT DOCUMENTS

| | | | | |
|---|---|---|---|---|
| 2011/0205147 A1* | 8/2011 | Wilson | ..................... | G06F 3/017 345/156 |
| 2016/0306431 A1* | 10/2016 | Stafford | .................. | G06F 3/014 |
| 2020/0005026 A1* | 1/2020 | Andersen | .............. | A63F 13/213 |
| 2020/0050259 A1* | 2/2020 | Lam | ..................... | G06F 3/04815 |

* cited by examiner

*Primary Examiner* — Brandon J Miller
(74) *Attorney, Agent, or Firm* — JCIPRNET

(57) ABSTRACT

A gesture recognition method and a gesture recognition device are provided. The gesture recognition method includes the steps of: obtaining a hand image including a gesture graphic; determining a reference point in the gesture graphic; determining circular arc reference lines by using the reference point as a center; determining intersection points of each of the circular arc reference lines intersecting with a boundary of the gesture graphic; determining whether at least two finger blocks of a plurality of finger blocks of the gesture graphic conform to an approaching trend according to the circular arc reference lines and the intersection points, and determining whether the at least two finger blocks in a selected range of the gesture graphic forms a continuous graphic block; and when the at least two finger blocks of the gesture graphic conform to the approaching trend and form the continuous graphic block, determining the hand image as a hand pinch image.

20 Claims, 4 Drawing Sheets

GESTURE RECOGNITION METHOD AND GESTURE RECOGNITION DEVICE

CROSS-REFERENCE TO RELATED APPLICATION

This application claims the priority benefit of Taiwan application serial no. 108107629, filed on Mar. 7, 2019. The entirety of the above-mentioned patent application is hereby incorporated by reference herein and made a part of this specification.

BACKGROUND

Technical Field

The disclosure relates to a recognition technique, and more particularly, to a gesture recognition method and a gesture recognition device.

Description of Related Art

In general, the early human-machine interaction functions of various head-mounted displays (HMD) for virtual reality (VR)/augmented reality (AR) could not enter the general consumer market due to the limitations of the computing processing speed, the big and heavy device body, the lack of supporting application software, and the high price. However, in recent years, electronic hardware technology has greatly improved, the hardware computing processing capability has been significantly enhanced, and the development of application software has also increased. Therefore, there has been a boom in application designs related to HMD devices in recent years. Moreover, with the popularization of mobile devices, product development of HMD devices mostly moves toward designs that are compact and light-weight but meanwhile have high processing power.

To enable the HMD device to provide a simulated interactive experience with the virtual environment, the HMD device is generally equipped with a sensor or a lens to capture and determine the user's gesture. In this regard, in the human-machine interaction functions of the HMD device, how to effectively determine the gesture/action of the user in an accurate and rapid manner has always been one of the important issues in the field. For example, in the case of pinch gesture recognition, the image analysis method of a general HMD device involves capturing the entire image including the hand image of the user in front of the lens and then performing image recognition processing on the entire image to determine whether the hand is in a pinch gesture and subsequently perform other corresponding software interaction functions. However, with the computing resources being limited by the physical size and the costs, the HMD device may not be able to support such a large data computation amount or may not be able to provide the recognition function in real-time. In view of the above, to realize accurate gesture recognition effect in real-time without consuming a lot of computing resources, the disclosure will provide a solution of at least one embodiment in the description below.

SUMMARY

In view of the above, the disclosure provides a gesture recognition method and a gesture recognition device that can effectively analyze a hand image of a user to accurately recognize whether the user's gesture is a pinch gesture.

A gesture recognition method according to an embodiment of the disclosure includes the following steps. A hand image is obtained, wherein the hand image includes a gesture graphic. A reference point in the gesture graphic is determined. A plurality of circular arc reference lines are determined by using the reference point as a center. A plurality of intersection points of each of the circular arc reference lines intersecting with a boundary of the gesture graphic are determined. It is determined whether at least two finger blocks of a plurality of finger blocks of the gesture graphic conform to an approaching trend according to the plurality of circular arc reference lines and the plurality of intersection points, and it is determined whether the at least two finger blocks in a selected range of the gesture graphic form a continuous graphic block. When the at least two finger blocks of the gesture graphic conform to the approaching trend and form the continuous graphic block, the hand image is determined to be a hand pinch image.

A gesture recognition device according to an embodiment of the disclosure includes an image capturing device and a processor. The image capturing device is configured to obtain a hand image. The hand image includes a gesture graphic. The processor is electrically coupled to the image capturing device. The processor is configured to analyze the gesture graphic of the hand image to determine a reference point in the gesture graphic. The processor determines a plurality of circular arc reference lines by using the reference point as a center, and determines a plurality of intersection points of each of the circular arc reference lines intersecting with a boundary of the gesture graphic. The processor determines whether at least two finger blocks of a plurality of finger blocks of the gesture graphic conform to an approaching trend according to the plurality of circular arc reference lines and the plurality of intersection points, and determines whether the at least two finger blocks in a selected range of the gesture graphic form a continuous graphic block. When the at least two finger blocks of the gesture graphic conform to the approaching trend and form the continuous graphic block, the processor determines that the hand image is a hand pinch image.

Based on the above, the gesture recognition method and the gesture recognition device of the disclosure can analyze the hand image of the user in real-time to first determine whether the plurality of finger blocks of the gesture graphic in the hand image conform to the approaching trend, and then determine whether the finger blocks form a continuous graphic block, so as to determine whether the hand image of the user is a hand pinch image. Therefore, the gesture recognition method and the gesture recognition device of the disclosure can accurately recognize whether the user's gesture is a pinch gesture.

To make the aforementioned more comprehensible, several embodiments accompanied with drawings are described in detail as follows.

DESCRIPTION OF THE EMBODIMENTS

Figure 1:
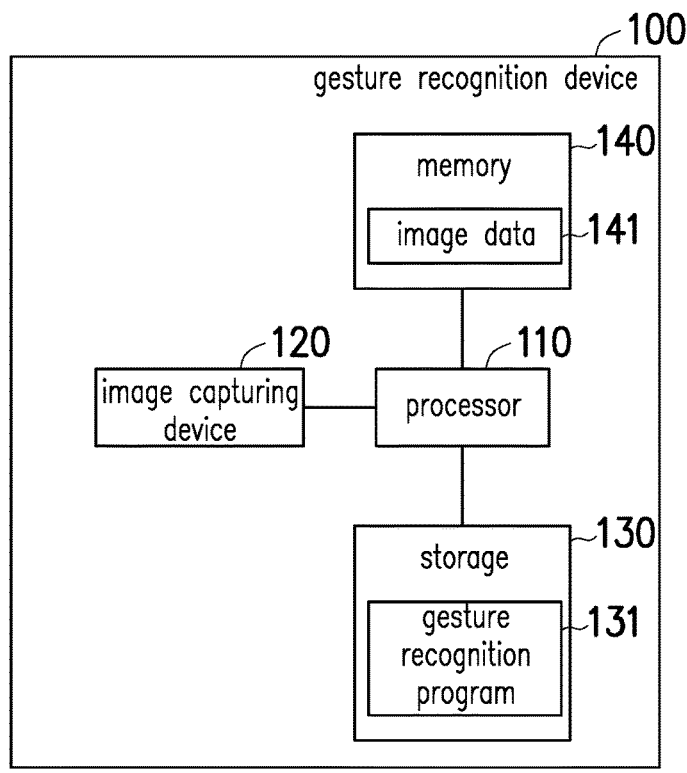
FIG. 1 is a schematic view of a gesture recognition device according to an embodiment of the disclosure.

To make the content of the disclosure more comprehensible, at least one embodiment will be provided below as an example for implementing the disclosure accordingly. In addition, wherever possible, elements, components, and steps labeled with the same numerals in the drawings and the embodiments represent the same or similar parts.

FIG. 1 is a schematic view of a gesture recognition device according to an embodiment of the disclosure. Referring to FIG. 1, a gesture recognition device 100 includes a processor 110, an image capturing device 120, a storage 130, and a gesture recognition program 131 that is stored in the storage 130 and may be loaded and executed by the processor 110. The processor 110 is electrically coupled to the image capturing device 120. In the present embodiment, the gesture recognition device 100 is, for example, applicable to various electronic devices or multimedia devices to provide a real-time gesture recognition function. Particularly, in specific embodiments, the gesture recognition device 100 of the disclosure may be combined with or applied to a head-mounted display (HMD) for virtual reality (VR) or augmented reality (AR), but the disclosure is not limited thereto. The gesture recognition device 100 of the present embodiment may provide a gesture recognition function and provide a gesture recognition result to a backend application or a backend device to perform other corresponding functions or operations.

Specifically, when a user's hand is located in front of the image capturing device 120, and the gesture recognition device 100 is performing the gesture recognition function, the image capturing device 120 obtains a hand image of the user, and the hand image includes a gesture graphic. Next, the image capturing device 120 provides the hand image to the gesture recognition program 131 to cause the processor 110 to perform image analysis. It is noted that the gesture recognition device 100 of the present embodiment is configured to provide a function of effectively determining whether a gesture of the user is a pinch gesture (e.g., an action in which the end of the user's thumb is in contact with the end of the index finger, and the rest of the fingers are folded against the palm; however, the disclosure is not limited thereto, and the end of the thumb may be in contact with the end of other one or more fingers). In other words, the processor 110 determines whether the hand image is a hand pinch image. In addition, in the present embodiment, the hand image analyzed by the processor 110 may be a grayscale or grayscale-processed image which further undergoes binarization processing, and the region in the gesture graphic and the region outside the gesture graphic in the hand image have different pixel values.

In the present embodiment, the processor 110 may be a graphics processing unit (GPU), an image signal processor (ISP), a central processing unit (CPU), another programmable general-purpose or specific-purpose microprocessor, digital signal processor (DSP), programmable controller, application specific integrated circuit (ASIC), programmable logic device (PLD), another similar processor, or a combination of the above processor circuits. Moreover, the gesture recognition device 100 of the present embodiment may further include a memory 140. The memory 140 may be configured to store image data 141 obtained by the image capturing device 120 and the image data 141 that is temporarily stored during processing of the gesture recognition program.

In the present embodiment, the image capturing device 120 may be a depth camera, an infrared camera, or an RGB camera. Taking the depth camera as an example, when the user's hand is located in front of the depth camera, the depth camera may obtain a hand image of the user based on the closer foreground through a determination of the distance threshold value. Taking the infrared camera as an example, when the user's hand is located in front of the infrared camera, the infrared camera may obtain the hand image by determining the region having the highest reflection brightness. Taking the RGB camera as an example, when the user's hand is located in front of the infrared camera, the RGB camera may find a region that is most similar to a hand through a pre-designed training model or a relevant learning algorithm to obtain the hand image.

Further, in an embodiment, if the image capturing device 120 is a depth camera or an RGB camera, the processor 110 first performs image data simplification on the hand image provided by the image capturing device 120. In other words, the processor 110 may first perform binarization processing on the hand image to facilitate subsequent image analysis. However, in another embodiment, if the image capturing device 120 is an infrared camera, since the image data provided by the infrared camera is already a grayscale image, the processor 110 may first perform fast binarization processing on the grayscale hand image, and then perform subsequent image analysis. In even another embodiment, if the hand image provided by the infrared camera is already a binary black-and-white image, the processor 110 may directly analyze the hand image provided by the infrared camera, and the processor 110 is not required to additionally perform binarization processing.

Figure 2:
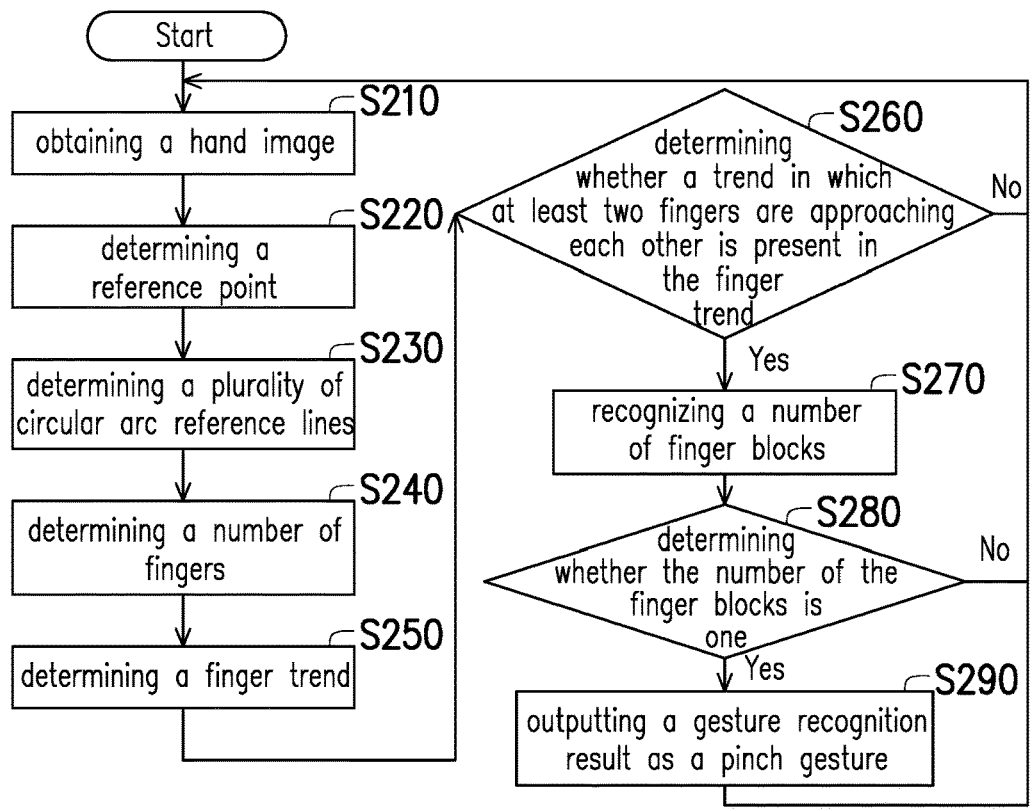
FIG. 2 is a flowchart of hand image analysis according to an embodiment of the disclosure.

FIG. 2 is a flowchart of hand image analysis according to an embodiment of the disclosure. Referring to FIG. 1 and FIG. 2, after being loaded, the gesture recognition program 131 of the gesture recognition device 100 may perform steps S210 to S290 of FIG. 2 to realize the gesture recognition function. In step S210, the gesture recognition device 100 obtains a hand image through the image capturing device 120 and provides the hand image to the processor 110 to cause the processor 110 to analyze the hand image. It is noted that the hand image analyzed by the processor 110 is a binarized image. However, whether processor 110 performs binarization processing on the hand image depends on the type of the image capturing device 120. In step S220, the processor 110 analyzes the hand image to determine a reference point in a gesture graphic of the hand image. In step S230, the processor 110 determines a plurality of circular arc reference lines by using the reference point as a center. In step S240, the processor 110 determines a number of fingers according to the plurality of circular arc reference lines. In step S250, the processor 110 determines a finger trend of the gesture graphic according to the plurality of circular arc reference lines. In step S260, the processor 110 determines whether a trend in which at least two fingers are approaching each other is present in the finger trend. If negative, the processor 110 performs step S210 again to obtain a next hand image. If affirmative, the processor 110 performs step S270 to recognize a number of finger blocks of the gesture graphic.

In step S270, the processor 110 recognizes a number of finger blocks of the gesture graphic according to the plurality of circular arc reference lines. In step S280, the processor 110 determines whether the number of the finger blocks of the gesture graphic is one. If negative, the processor 110 performs step S210 again to obtain a next hand image. If affirmative, the processor 110 performs step S290 to output a gesture recognition result as a pinch gesture. In other words, in the present embodiment, the gesture recognition device 100 performs recognition in two stages. In the first stage, the processor 110 first analyzes whether a trend in which at least two fingers are approaching each other is present in the finger trend of the gesture graphic to indicate that the user's gesture may be a pinch gesture. If the gesture graphic in the hand image satisfies the above condition in the first stage, the processor 110 performs the second stage. In the second stage, the processor 110 further analyzes the number of the finger blocks of the gesture graphic. If the number of the finger blocks of the gesture graphic is one, it means that a plurality of finger blocks are connected to each other to form a continuous graphic block, and that the user's finger action is a pinch action. Conversely, if the finger blocks of the gesture graphic is not a continuous graphic block, it means that the user's finger action is not a pinch action. Accordingly, the gesture recognition device 100 of the present embodiment can provide an accurate real-time pinch gesture recognition result.

To allow those skilled in the art to further understand the implementation details of the gesture recognition of the disclosure, two different examples of the hand image as presented in FIG. 3 and FIG. 4 will be described in detail below.

Figure 3:
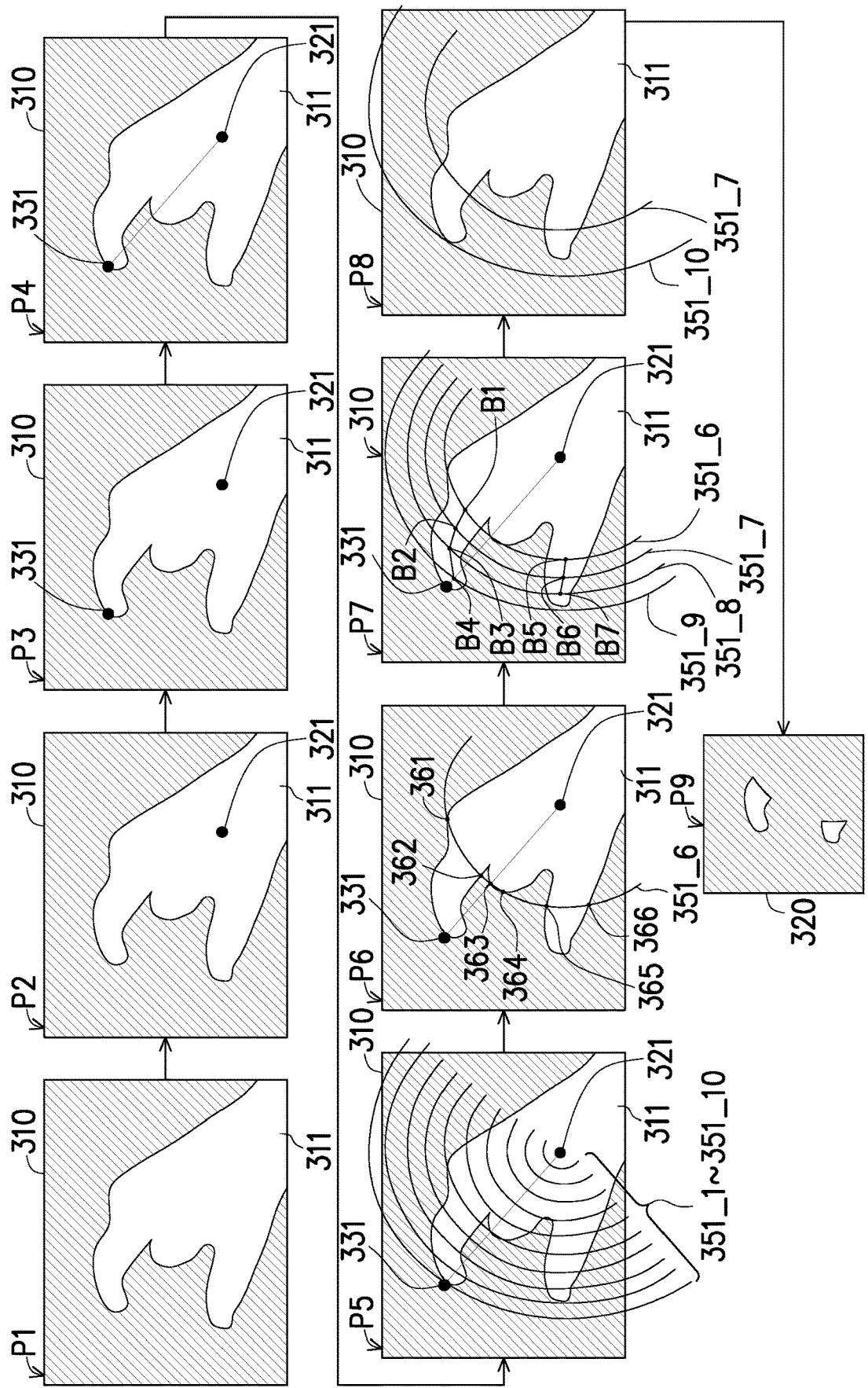
FIG. 3 is a schematic view of analysis on a hand image according to an embodiment of the disclosure.

FIG. 3 is a schematic view of analysis on a hand image according to an embodiment of the disclosure. Reference is made to FIG. 1 to FIG. 3 as well as the flowchart of the gesture recognition method of FIG. 2. In step S210 (corresponding to an analysis stage P1), the gesture recognition device 100 obtains a hand image 310 through the image capturing device 120 and provides the hand image 310 to the processor 110 to cause the processor 110 to analyze a gesture graphic 311 in the hand image 310. A pixel value in the region of the gesture graphic 311 in the binarized hand image 310 is, for example, 255, and a pixel value outside the region of the gesture graphic 311 is, for example, 0, but the disclosure is not limited thereto. In step S220 (corresponding to an analysis stage P2), the processor 110 calculates an average of a plurality of coordinate values of the gesture graphic 311 to determine a reference point 321 in the gesture graphic 311 of the hand image 310. In other words, the processor 110 uses the graphic center point of the gesture graphic 311 as the reference point 321. In step S230 (corresponding to analysis stages P3 to P5), the processor 110 determines a farthest point 331 corresponding to the reference point 321 in the gesture graphic 311, and the processor 110 determines a plurality of radii having different lengths corresponding to a plurality of circular arc reference lines 351_1 to 351_10 based on a connecting line (having a length of r, for example) between the reference point 321 and the farthest point 331. In the present embodiment, the plurality of circular arc reference lines 351_1 to 351_10 may respectively be semi-circular arc lines, and the plurality of circular arc reference lines are spaced apart at an equal interval. The radii of the plurality of circular arc reference lines 351_1 to 351_10 may be as shown in Table 1 below. However, the number and the interval of the circular arc reference lines of the disclosure are not limited to those shown in Table 1 below. In an embodiment, the number and the interval of the circular arc reference lines may be correspondingly designed according to different gesture recognition requirements.

TABLE 1

| Reference line | Radius |
| --- | --- |
| Circular arc reference line 351_1 | r/10 |
| Circular arc reference line 351_2 | 2r/10 |
| Circular arc reference line 351_3 | 3r/10 |
| Circular arc reference line 351_4 | 4r/10 |
| Circular arc reference line 351_5 | 5r/10 |
| Circular arc reference line 351_6 | 6r/10 |
| Circular arc reference line 351_7 | 7r/10 |
| Circular arc reference line 351_8 | 8r/10 |
| Circular arc reference line 351_9 | 9r/10 |
| Circular arc reference line 351_10 | r |

In step S240 (corresponding to an analysis stage P6), the processor 110 determines an intersection point number of a plurality of intersection points of each of the plurality of circular arc reference lines 351_1 to 351_10 intersecting with the boundary of the gesture graphic 311 in a counter-clockwise manner, for example. In the present embodiment, the boundary of the gesture graphic 311 refers to a borderline of a pixel value change, for example, from black (the pixel value of the region outside the gesture graphic is 0) to white (the pixel value of the region in the gesture graphic is 255), or from white to black. Therefore, the intersection point number of the plurality of intersection points of each of the plurality of circular arc reference lines 351_1 to 351_10 intersecting with the boundary of the gesture graphic 311 may be as shown in Table 2 below. In the present embodiment, the processor 110 may select one of the plurality of circular arc reference lines 351_1 to 351_10 that has the highest intersection point number with respect to the boundary of the gesture graphic 311 to determine the number of fingers. Moreover, taking Table 2 as an example, the processor 110 may determine that the circular arc reference line 351_6 has the most intersection points with the boundary of the gesture graphic 311. For example, three intersection points 361, 363, and 365 changing from black to white and three intersection points 362, 364, and 366 changing from white to black are present between the circular arc reference line 351_6 and the boundary of the gesture graphic 311. Therefore, the processor 110 may determine that the number of fingers of the gesture graphic 311 is three based on the plurality of intersection points 361 to 366 of the circular arc reference line 351_6. However, in other embodiments, if the plurality of circular arc reference lines 351_1 to 351_10 include multiple circular arc reference lines equally having the most intersection points, the processor 110 selects one that is farthest from the reference point 321 as the basis for determining the number of fingers.

TABLE 2

| Reference line | Intersection point number (from black to white) | Intersection point number (from white to black) |
| --- | --- | --- |
| Circular arc reference line 351_1 | 0 | 0 |
| Circular arc reference line 351_2 | 0 | 0 |
| Circular arc reference line 351_3 | 0 | 0 |
| Circular arc reference line 351_4 | 1 | 1 |
| Circular arc reference line 351_5 | 2 | 2 |
| Circular arc reference line 351_6 | 3 | 3 |
| Circular arc reference | 2 | 2 |

TABLE 2-continued

| Reference line | Intersection point number (from black to white) | Intersection point number (from white to black) |
| --- | --- | --- |
| line 351_7 | | |
| Circular arc reference line 351_8 | 2 | 2 |
| Circular arc reference line 351_9 | 2 | 2 |
| Circular arc reference line 351_10 | 1 | 0 |

In step S250 (corresponding to an analysis stage P7), the processor 110 selects the circular arc reference line 351_6, which has the highest intersection point number, as a first recognition boundary, and selects the circular arc reference line 351_9, which is the previous circular arc reference line to the circular arc reference line 351_10 farthest from the reference point, as a second recognition boundary. In the present embodiment, from all the intersection points of each of the circular arc reference lines between the first recognition boundary and the second recognition boundary, the processor 110 selects coordinates of two intersection points that are adjacent to each other and are located in the gesture graphic, and calculates their center point coordinates to be defined as a finger skeleton point. Therefore, the plurality of circular arc reference lines 351_6 to 351_9 generate a plurality of finger skeleton points B1 to B7. In other words, the processor 110 is only required to analyze a portion of the hand image 310. Next, according to a plurality of skeleton point connecting lines of the plurality of finger skeleton points B1 to B7, the processor 110 determines whether the plurality of finger blocks of the gesture graphic 311 conform to a trend in which at least two skeleton point connecting lines are approaching each other. The approaching trend means, for example, that the shape of one finger block is approaching the shape of another finger block, but the disclosure is not limited thereto. However, the determination of the trend analysis (e.g., divergence or convergence of multiple data over time) is a conventional technical means commonly used in statistical analysis of various engineering or financial data. The trend analysis functions are also provided in general spreadsheet software and conventionally publicly known techniques, which shall not be repeatedly described herein. In the present embodiment, the processor 110 respectively connects the plurality of finger skeleton points B1 to B7 in each of the finger blocks to determine the plurality of skeleton point connecting lines. For example, the skeleton points B1 to B4 form a connecting line, and the skeleton points B5 to B7 form another connecting line.

In step S260 (corresponding to the analysis stage P7), when the plurality of skeleton point connecting lines include at least two skeleton point connecting lines that are approaching each other, the processor 110 determines that the plurality of finger blocks of the gesture graphic 311 conform to the approaching trend, and the processor 110 performs step S270. Conversely, when none of the plurality of skeleton point connecting lines are approaching each other, the processor 110 determines that the plurality of finger blocks of the gesture graphic 311 do not conform to the approaching trend, and the processor 110 performs step S210 again to obtain a next hand image.

In step S270 (corresponding to analysis stages P8 to P9), the processor 110 selects the circular arc reference line 351_7, which is the next circular arc reference line to the circular arc reference line 351_6 having the highest intersection point number, as a third recognition boundary, and selects the circular arc reference line 351_10, which is farthest from the reference point 321, as a fourth recognition boundary. In step S280, the processor 110 determines whether the plurality of finger blocks of the gesture graphic 311 between the third recognition boundary and the fourth recognition boundary is connected into one. In this regard, as shown by a partial hand image 320 that is cut out between the third recognition boundary and the fourth recognition boundary, since the plurality of finger blocks of the gesture graphic 311 that are cut out between the third recognition boundary and the fourth recognition boundary are not connected into one (there are two blocks in the partial hand image 320), the plurality of finger blocks of the gesture graphic 311 between the third recognition boundary and the fourth recognition boundary do not form a continuous graphic block. Therefore, the processor 110 determines that the gesture graphic 311 of the hand image 310 is not a pinch gesture (as, in general, the end of the thumb and the end of another finger in the pinch gesture are brought into contact with each other and connected together), and the processor 110 performs step S210 again to obtain a next hand image. Accordingly, by analyzing a portion of the hand image 310 (it is only required to analyze the image content between the two recognition boundaries), the gesture recognition device 100 of the present embodiment can accurately recognize in real-time that the gesture graphic 311 of the hand image 310 is not a pinch gesture, and it is not required to continuously compute or process the entire hand image 310.

Figure 4:
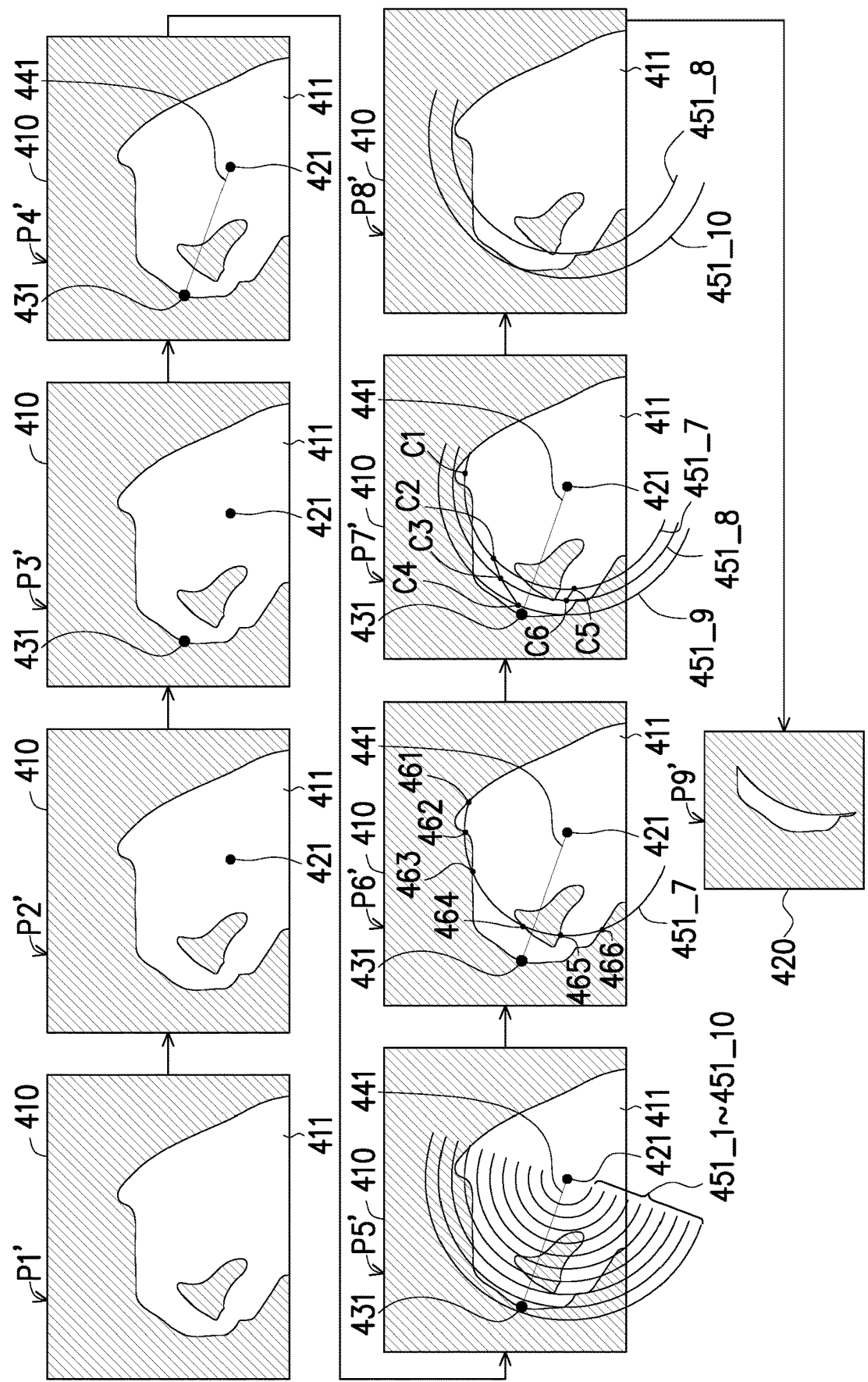
FIG. 4 is a schematic view of analysis on another hand image according to an embodiment of the disclosure.

FIG. 4 is a schematic view of analysis on another hand image according to an embodiment of the disclosure. Reference is made to FIG. 1, FIG. 2, and FIG. 4 as well as the flowchart of the gesture recognition method of FIG. 2. In step S210 (corresponding to an analysis stage P1'), the gesture recognition device 100 obtains a hand image 410 through the image capturing device 120 and provides the hand image 410 to the processor 110 to cause the processor 110 to analyze a gesture graphic 411 in the hand image 410. A pixel value in the region of the gesture graphic 411 in the hand image 410 is, for example, 255, and a pixel value outside the region of the gesture graphic 411 is, for example, 0, but the disclosure is not limited thereto. In step S220 (corresponding to an analysis stage P2'), the processor 110 calculates an average of a plurality of coordinate values of the gesture graphic 411 to determine a reference point 421 in the gesture graphic 411 of the hand image 410. In other words, the processor 110 uses the graphic center point of the gesture graphic 411 as the reference point 421. In step S230 (corresponding to analysis stages P3' to P5'), the processor 110 determines a farthest point 431 corresponding to the reference point 421 in the gesture graphic 311, and the processor 110 determines a plurality of radii having different lengths corresponding to a plurality of circular arc reference lines 451_1 to 451_10 based on a connecting line (having a length of r, for example) between the reference point 421 and the farthest point 431. In the present embodiment, the plurality of circular arc reference lines 451_1 to 451_10 may respectively be semi-circular arc lines, and the plurality of circular arc reference lines are spaced apart at an equal interval. The radii of the plurality of circular arc reference lines 451_1 to 451_10 may be as shown in Table 3 below. However, the number and the interval of the circular arc reference lines of the disclosure are not limited to those shown in Table 3 below. In an embodiment, the number and the interval of the circular arc reference lines may be correspondingly designed according to different gesture recognition requirements.

TABLE 3

| Reference line | Radius |
| --- | --- |
| Circular arc reference line 451_1 | r/10 |
| Circular arc reference line 451_2 | 2r/10 |
| Circular arc reference line 451_3 | 3r/10 |
| Circular arc reference line 451_4 | 4r/10 |
| Circular arc reference line 451_5 | 5r/10 |
| Circular arc reference line 451_6 | 6r/10 |
| Circular arc reference line 451_7 | 7r/10 |
| Circular arc reference line 451_8 | 8r/10 |
| Circular arc reference line 451_9 | 9r/10 |
| Circular arc reference line 451_10 | r |

In step S240 (corresponding to an analysis stage P6'), the processor 110 determines an intersection point number of a plurality of intersection points of each of the plurality of circular arc reference lines 451_1 to 451_10 intersecting with the boundary of the gesture graphic 411 in a counter-clockwise manner, for example. In the present embodiment, the boundary of the gesture graphic 411 refers to a borderline of a pixel value change, for example, from black (the pixel value of the region outside the gesture graphic is 0) to white (the pixel value of the region in the gesture graphic is 255), or from white to black. Therefore, the intersection point number of the plurality of intersection points of each of the plurality of circular arc reference lines 451_1 to 451_10 intersecting with the boundary of the gesture graphic 411 may be as shown in Table 4 below. In the present embodiment, the processor 110 may select one of the plurality of circular arc reference lines 451_1 to 451_10 that has the highest intersection point number with respect to the boundary of the gesture graphic 411 to determine the number of fingers. Moreover, taking Table 4 as an example, the processor 110 may determine that the circular arc reference line 451_7 has the most intersection points with the boundary of the gesture graphic 411. For example, three intersection points 461, 463, and 465 changing from black to white and three intersection points 462, 464, and 466 changing from white to black are present between the circular arc reference line 451_7 and the boundary of the gesture graphic 411. Therefore, the processor 110 may determine that the number of fingers of the gesture graphic 411 is three based on the plurality of intersection points 461 to 466 of the circular arc reference line 451_7. However, in other embodiments, if the plurality of circular arc reference lines 451_1 to 451_10 include multiple circular arc reference lines equally having the most intersection points, the processor 110 selects one that is farthest from the reference point 421 as the basis for determining the number of fingers.

TABLE 4

| Reference line | Intersection point number (black to white) | Intersection point number (white to black) |
| --- | --- | --- |
| Circular arc reference line 451_1 | 0 | 0 |
| Circular arc reference line 451_2 | 0 | 0 |
| Circular arc reference line 451_3 | 0 | 0 |
| Circular arc reference line 451_4 | 1 | 1 |
| Circular arc reference line 451_5 | 1 | 1 |
| Circular arc reference line 451_6 | 1 | 2 |
| Circular arc reference line 451_7 | 3 | 3 |
| Circular arc reference line 451_8 | 2 | 2 |
| Circular arc reference line 451_9 | 1 | 1 |
| Circular arc reference line 451_10 | 1 | 0 |

In step S250 (corresponding to an analysis stage P7'), the processor 110 selects the circular arc reference line 451_7, which has the highest intersection point number, as a first recognition boundary, and selects the circular arc reference line 451_9, which is the previous circular arc reference line to the circular arc reference line 451_10 farthest from the reference point, as a second recognition boundary. In the present embodiment, from all the intersection points of each of the circular arc reference lines between the first recognition boundary and the second recognition boundary, the processor 110 selects coordinates of two intersection points that are adjacent to each other and are located in the gesture graphic, and calculates their center point coordinates to be defined as a finger skeleton point. Therefore, the plurality of circular arc reference lines 451_7 to 451_9 generate a plurality of finger skeleton points C1 to C6. In other words, the processor 110 is only required to analyze a portion of the hand image 410. Next, according to a plurality of skeleton point connecting lines of the plurality of finger skeleton points C1 to C6, the processor 110 determines whether the plurality of finger blocks of the gesture graphic 411 conform to a trend in which at least two skeleton point connecting lines are approaching each other. In the present embodiment, the approaching trend means, for example, that the shape of one finger block is approaching the shape of another finger block, but the disclosure is not limited thereto. In the present embodiment, the processor 110 respectively connects the plurality of finger skeleton points C1 to C6 in each of the finger blocks to determine the plurality of skeleton point connecting lines. For example, the skeleton point C1 is a single point, the skeleton points C2 to C4 form a connecting line, and the skeleton points C5 to C6 form another connecting line.

In step S260 (corresponding to the analysis stage P7'), when the plurality of skeleton point connecting lines include at least two skeleton point connecting lines that are approaching each other, the processor 110 determines that the plurality of finger blocks of the gesture graphic 411 conform to the approaching trend, and the processor 110 performs step S270. Conversely, when none of the plurality of skeleton point connecting lines are approaching each other, the processor 110 determines that the plurality of finger blocks of the gesture graphic 411 do not conform to the approaching trend, and the processor 110 performs step S210 again to obtain a next hand image.

In step S270 (corresponding to analysis stages P8' to P9'), the processor 110 selects the circular arc reference line 451_8, which is the next circular arc reference line to the circular arc reference line 451_7 having the highest intersection point number, as a third recognition boundary, and selects the circular arc reference line 451_10, which is farthest from the reference point 421, as a fourth recognition boundary. In step S280, the processor 110 determines whether the plurality of finger blocks of the gesture graphic 411 between the third recognition boundary and the fourth recognition boundary is connected into one. In this regard, as shown by a partial hand image 420 that is cut out between the third recognition boundary and the fourth recognition boundary, since the plurality of finger blocks of the gesture graphic 411 that are cut out between the third recognition boundary and the fourth recognition boundary are connected into one, the plurality of finger blocks of the gesture graphic 411 between the third recognition boundary and the fourth recognition boundary form a continuous graphic block. Therefore, the processor 110 determines that the gesture graphic 411 of the hand image 410 is a pinch gesture. The processor 110 performs step S290 to output a gesture recognition result for the backend application or the backend device to perform other corresponding functions or operations. Accordingly, by analyzing a portion of the hand image 410 (it is only required to analyze the image content between the two recognition boundaries), the gesture recognition device 100 of the present embodiment can accurately recognize in real-time that the gesture graphic 411 of the hand image 410 is a pinch gesture, and it is not required to continuously compute or process the entire hand image 410.

Figure 5:
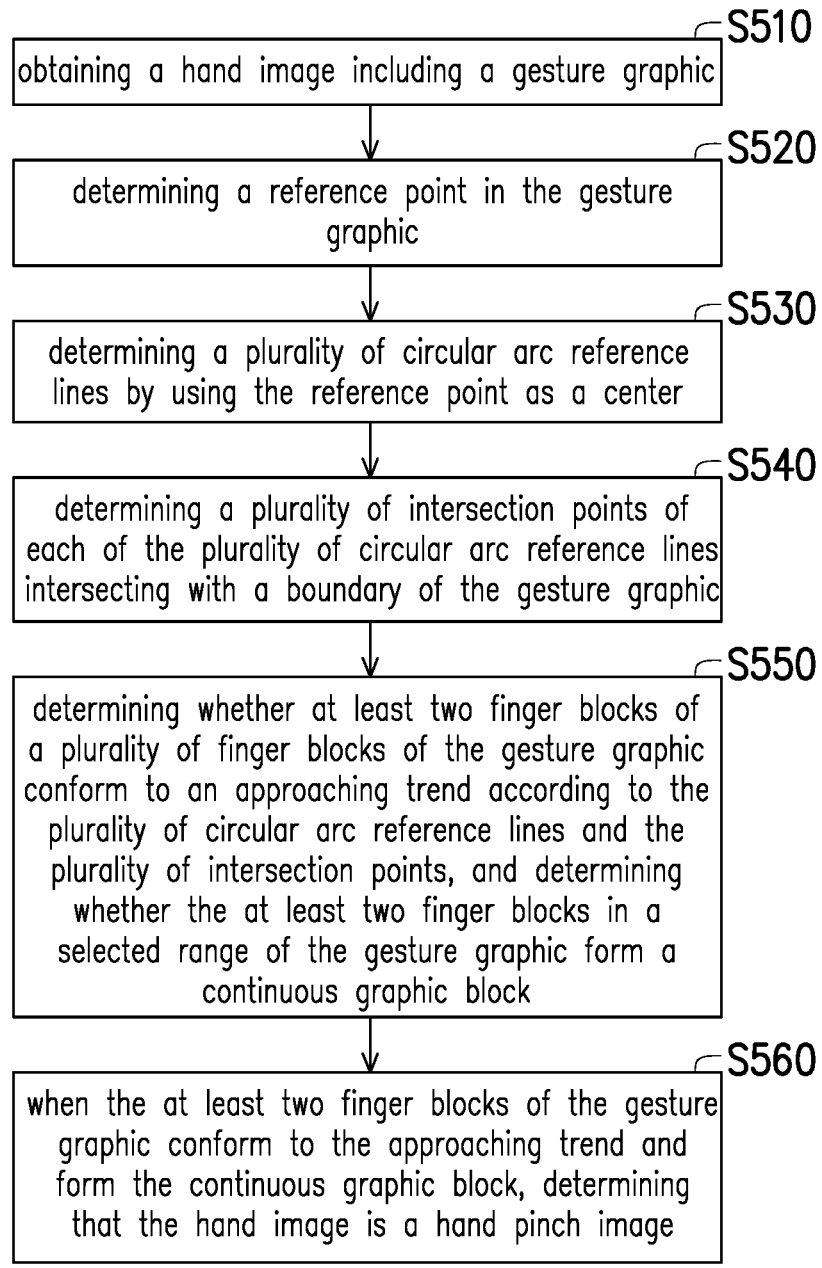
FIG. 5 is a flowchart of a gesture recognition method according to an embodiment of the disclosure.

FIG. 5 is a flowchart of a gesture recognition method according to an embodiment of the disclosure. Referring to FIG. 1 and FIG. 5, the gesture recognition method of the present embodiment is applicable to at least the gesture recognition device 100 of the embodiment of FIG. 1 to cause the gesture recognition device 100 to perform steps S510 to S560. In step S510, the gesture recognition device 100 obtains a hand image through the image capturing device 120. In step S520, the gesture recognition device 100 analyzes the hand image through the processor 110 to determine a reference point in a gesture graphic of the hand image. In step S530, the processor 110 determines a plurality of circular arc reference lines by using the reference point as a center. In step S540, the processor 110 determines a plurality of intersection points of each of the plurality of circular arc reference lines intersecting with a boundary of the gesture graphic. In step S550, the processor 110 determines whether a plurality of finger blocks of the gesture graphic conform to an approaching trend according to the plurality of circular arc reference lines and the plurality of intersection points, so as to further determine whether the plurality of finger blocks of the gesture graphic form a continuous graphic block. In step S560, when the plurality of finger blocks of the gesture graphic conform to the approaching trend and form the continuous graphic block, the processor 110 determines that the hand image is a hand pinch image. Therefore, according to the gesture recognition method of the present embodiment, the gesture recognition device 100 can accurately recognize the user's gesture in real-time.

In addition, regarding the implementation details of the steps of the present embodiment and other implementation features of the gesture recognition device 100, reference may be made to the contents of the foregoing embodiments of FIG. 1 to FIG. 4 to obtain sufficient teachings, suggestions, and implementation descriptions, which shall not be repeatedly described herein.

In summary of the above, the gesture recognition method and the gesture recognition device of the disclosure can analyze the hand image of the user in real-time to first determine whether the plurality of finger blocks of the gesture graphic in the partial hand image conform to the approaching trend, and then determine whether the finger blocks in the partial hand image form a continuous graphic block, so as to determine whether the hand image of the user is a hand pinch image. Therefore, the gesture recognition method and the gesture recognition device of the disclosure can realize the gesture recognition function without continuously computing the entire hand image data.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gesture recognition method comprising:
obtaining a hand image, wherein the hand image comprises a gesture graphic;
determining a reference point in the gesture graphic;
determining a plurality of circular arc reference lines by using the reference point as a center;
determining a plurality of intersection points of each of the circular arc reference lines intersecting with a boundary of the gesture graphic;
determining whether at least two finger blocks of a plurality of finger blocks of the gesture graphic conform to an approaching trend according to the circular arc reference lines and the intersection points, and determining whether the at least two finger blocks in a selected range of the gesture graphic form a continuous graphic block; and
when the at least two finger blocks of the gesture graphic conform to the approaching trend and form the continuous graphic block, determining that the hand image is a hand pinch image.

2. The gesture recognition method according to claim 1, wherein the step of determining the reference point in the gesture graphic comprises:
calculating an average of a plurality of coordinate values of the gesture graphic to obtain the reference point.

3. The gesture recognition method according to claim 1, wherein the step of determining the circular arc reference lines by using the reference point as the center comprises:
determining a farthest point corresponding to the reference point in the gesture graphic; and
determining a plurality of radii having different lengths corresponding to the circular arc reference lines based on a connecting line between the reference point and the farthest point.

4. The gesture recognition method according to claim 3, wherein the circular arc reference lines are respectively semi-circular arc lines, and the circular arc reference lines are spaced apart at an equal interval.

5. The gesture recognition method according to claim 1, wherein the step of determining whether the at least two finger blocks of the gesture graphic conform to the approaching trend comprises:
selecting one of the circular arc reference lines that has a highest intersection point number as a first recognition boundary;
selecting another one circular arc reference line, which is the previous circular arc reference line to the circular arc reference line farthest from the reference point among the circular arc reference lines, as a second recognition boundary; and
determining whether the at least two finger blocks of the gesture graphic between the first recognition boundary and the second recognition boundary conform to the approaching trend.

6. The gesture recognition method according to claim 5, further comprising:
  from all the intersection points of each of the circular arc reference lines between the first recognition boundary and the second recognition boundary, selecting coordinates of two intersection points that are adjacent to each other and located in the gesture graphic and calculating their center point coordinates to be defined as a finger skeleton point; and
  determining whether the at least two finger blocks of the gesture graphic conform to the approaching trend according to a plurality of skeleton point connecting lines of the finger skeleton points.

7. The gesture recognition method according to claim 6, wherein the step of determining whether the at least two finger blocks of the gesture graphic conform to the approaching trend according to the skeleton point connecting lines of the finger skeleton points comprises:
  respectively connecting the finger skeleton points in each of the finger blocks to determine the skeleton point connecting lines.

8. The gesture recognition method according to claim 6, wherein the step of determining whether the at least two finger blocks of the gesture graphic conform to the approaching trend according to the skeleton point connecting lines of the finger skeleton points comprises:
  when at least two of the skeleton point connecting lines are approaching each other, determining that the at least two finger blocks of the gesture graphic conform to the approaching trend.

9. The gesture recognition method according to claim 1, wherein the step of determining whether the at least two finger blocks in the selected range of the gesture graphic form the continuous graphic block comprises:
  selecting one circular arc reference line, which is the next circular arc reference line to the circular arc reference line having a highest intersection point number among the circular arc reference lines, as a third recognition boundary;
  selecting another one of the circular arc reference lines that is farthest from the reference point as a fourth recognition boundary; and
  determining whether the at least two finger blocks of the gesture graphic between the third recognition boundary and the fourth recognition boundary form the continuous graphic block.

10. The gesture recognition method according to claim 1, wherein the hand image is a binarized image, and a region in the gesture graphic and a region outside the gesture graphic of the hand image have different pixel values.

11. A gesture recognition device comprising:
  an image capturing device configured to obtain a hand image, wherein the hand image comprises a gesture graphic; and
  a processor, electrically coupled to the image capturing device, configured to analyze the gesture graphic of the hand image to determine a reference point in the gesture graphic,
  wherein the processor determines a plurality of circular arc reference lines by using the reference point as a center, and determines a plurality of intersection points of each of the circular arc reference lines intersecting with a boundary of the gesture graphic,
  wherein the processor determines whether at least two finger blocks of a plurality of finger blocks of the gesture graphic conform to an approaching trend according to the circular arc reference lines and the intersection points, and determines whether the at least two finger blocks in a selected range of the gesture graphic form a continuous graphic block,
  wherein when the at least two finger blocks of the gesture graphic conform to the approaching trend and form the continuous graphic block, the processor determines that the hand image is a hand pinch image.

12. The gesture recognition device according to claim 11, wherein the processor calculates an average of a plurality of coordinate values of the gesture graphic to obtain the reference point.

13. The gesture recognition device according to claim 11, wherein the processor determines a farthest point corresponding to the reference point in the gesture graphic, and the processor determines a plurality of radii having different lengths corresponding to the circular arc reference lines based on a connecting line between the reference point and the farthest point.

14. The gesture recognition device according to claim 13, wherein the circular arc reference lines are respectively semi-circular arc lines, and the circular arc reference lines are spaced apart at an equal interval.

15. The gesture recognition device according to claim 11, wherein the processor selects one of the circular arc reference lines that has a highest intersection point number as a first recognition boundary, and the processor selects another one circular arc reference line, which is the previous circular arc reference line to the circular arc reference line farthest from the reference point among the circular arc reference lines, as a second recognition boundary,
  wherein the processor determines whether the at least two finger blocks of the gesture graphic between the first recognition boundary and the second recognition boundary conform to the approaching trend.

16. The gesture recognition device according to claim 15, wherein, from all the intersection points of each of the circular arc reference lines between the first recognition boundary and the second recognition boundary, the processor selects coordinates of two intersection points that are adjacent to each other and located in the gesture graphic and calculates their center point coordinates to be defined as a finger skeleton point, and the processor determines whether the at least two finger blocks of the gesture graphic conform to the approaching trend according to a plurality of skeleton point connecting lines of the finger skeleton points.

17. The gesture recognition device according to claim 16, wherein the processor respectively connects the finger skeleton points in each of the finger blocks to determine the skeleton point connecting lines.

18. The gesture recognition device according to claim 16, wherein when at least two of the skeleton point connecting lines are approaching each other, the processor determines that the at least two finger blocks of the gesture graphic conform to the approaching trend.

19. The gesture recognition device according to claim 11, wherein the processor selects one circular arc reference line, which is the next circular arc reference line to the circular arc reference line having a highest intersection point number among the circular arc reference lines, as a third recognition boundary, and the processor selects another one of the circular arc reference lines that is farthest from the reference point as a fourth recognition boundary,
  wherein the processor determines whether the at least two finger blocks of the gesture graphics between the third recognition boundary and the fourth recognition boundary form the continuous graphic block.

20. The gesture recognition device according to claim 11, wherein the hand image is a binarized image, and a region in the gesture graphic and a region outside the gesture graphic of the hand image have different pixel values.

* * * * *